United States Patent

[11] 3,622,037

[72] Inventor Richard F. Gildart
Montebello, Calif.
[21] Appl. No. 842,489
[22] Filed July 17, 1969
[45] Patented Nov. 23, 1971
[73] Assignee Rehrig Pacific Company
Los Angeles, Calif.

[54] REINFORCED PLASTIC CRATE
6 Claims, 4 Drawing Figs.

[52] U.S. Cl........................................................ 220/73
[51] Int. Cl....................................................... B65d 7/42
[50] Field of Search........................................ 220/73

[56] References Cited
UNITED STATES PATENTS
| | | | |
|---|---|---|---|
| 1,207,937 | 12/1916 | Kruse | 220/73 |
| 3,341,060 | 9/1967 | Rehrig et al. | 220/73 |
| 3,419,182 | 12/1968 | Gildart | 220/73 |
| 3,442,418 | 5/1969 | Stromberg | 220/73 |

Primary Examiner—Joseph R. Leclair
Assistant Examiner—James R. Garrett
Attorney—Beveridge & DeGrandi ABSTRACT: A material handling crate having molded plastic side panels and an open top portion reinforced by an endless steel ring extending around the top of the crate and having an exposed upper surface forming at least a portion of the top surface of the rim of the crate.

PATENTED NOV 23 1971  3,622,037

INVENTOR
RICHARD F GILDART

BY Beveridge & De Grandi

ATTORNEYS

REINFORCED PLASTIC CRATE

This invention relates to crates, and more particularly to crates having sidewalls molded from synthetic resin materials and an open top reinforced by a metal ring.

The use of material handling crates formed from synthetic resin materials, hereinafter referred to as plastic, is currently expanding very rapidly. This expanded use has been, in part, made possible by the practice of reinforcing the crates adjacent the open top portion by metal rings or bars. This practice has been particularly useful in heavy duty crates or tote boxes such as those employed in the dairy industry or as field crates for vegetables or the like. Numerous arrangements have been devised for reinforcing the top portions of such crates, and one such arrangement is illustrated in my prior U.S. Pat. 3,419,182.

While the prior art reinforcing schemes have generally been successful, it has been found that they have not been entirely satisfactory for certain uses of heavy duty crates which are normally designed to be stacked one on top of the other in the manner illustrated, for example, in U.S. Pat. 3,361,292. In the prior art crates, the primary purpose of the reinforcing ring has been to provide dimensional stability for the top of the crate and to reinforce the side panels to enable the crate to withstand lateral loads. While these functions of the reinforcing ring are in most cases essential, it may also be desirable to protect the plastic material at the top rim portion of the crate from damage resulting from impact loads to the top rim during handling, stacking, emptying, or cleaning of the crates. Accordingly, it is the primary object of the present invention to provide an improved reinforced molded plastic crate in which the reinforcing member has an exposed upper surface at the rim of the container to protect the plastic material at the rim.

The foregoing and other objects are obtained in a material handling crate according to present invention, and including molded sidewalls having integrally formed thereon a generally horizontal ledge extending in vertically spaced relation below the top rim surface of the plastic sidewalls. An endless steel reinforcing ring is positioned around the crate in contact with the horizontal ledge, with the ring extending above the ledge and terminating in an exposed upper edge surface. The crate is formed with a plurality of openings extending through the plastic walls adjacent the ledge, and a plurality of tabs are integrally formed on the reinforcing rod member in position to extend through the spaced openings providing an interlocking arrangement retaining the reinforcing ring on the crate and in contact with a peripheral edge surface thereof adjacent the rim of the crate.

Other objects and advantages of the invention will become apparent from the following specification, taken with the accompanying drawings, in which.

Figure 1:
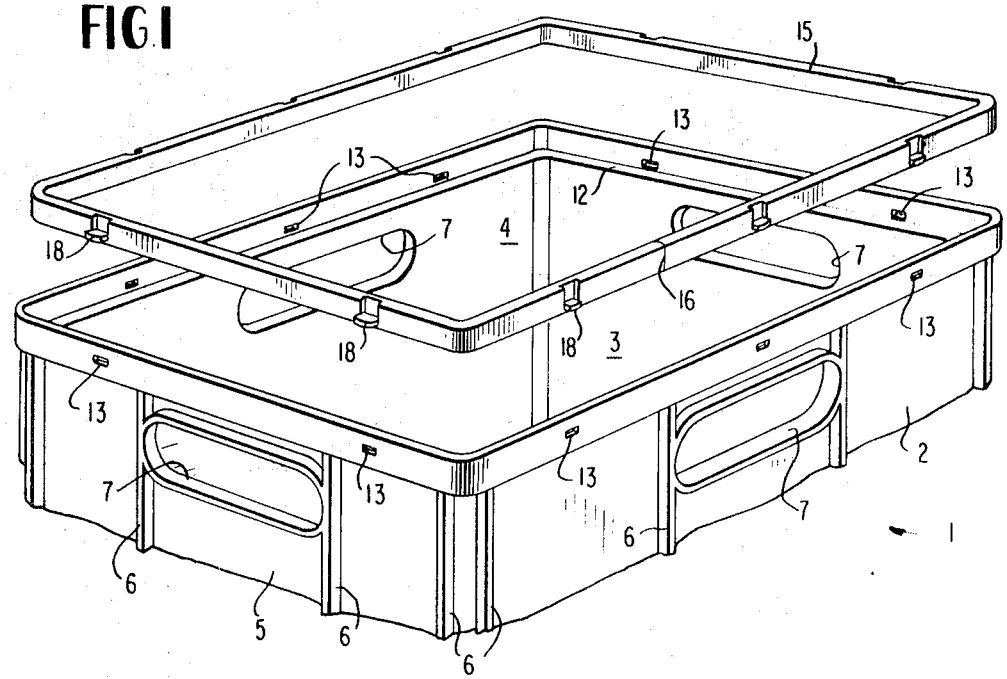
FIG. 1 is a perspective view of the top portion of a molded plastic crate according to one embodiment of the present invention, with the reinforcing ring in position to be installed on the crate.

Referring now to the drawings in detail, the top portion of a reinforced plastic material handling crate according to one embodiment of the present invention is indicated generally by the reference numeral 1 and is shown in FIG. 1 as having four integrally molded, vertically extending plastic sidewall panels indicated generally by the reference numerals 2, 3, 4 and 5, respectively. The vertical side panels may each be formed with a plurality of reinforcing, or stiffening ribs 6, as desired, and a handle opening 7 may be formed in the respective side panels in the conventional manner.

Figure 2:
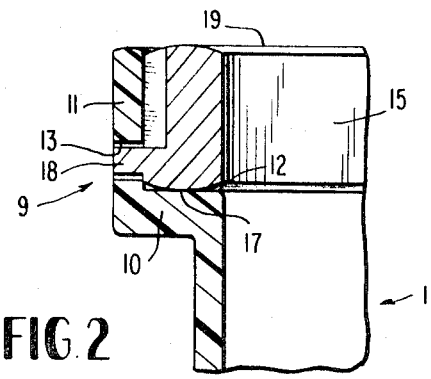
FIG. 2 is an enlarged fragmentary sectional view of the reinforcing ring and the crate of FIG. 1 after assembly.
Figure 3:
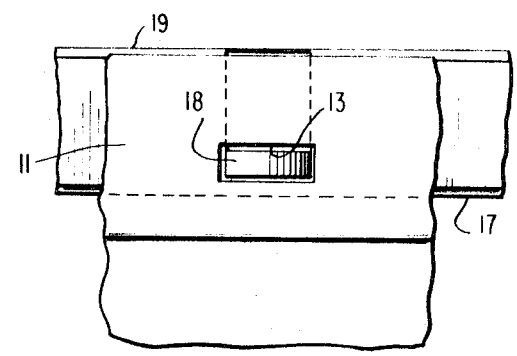
FIG. 3 is a fragmentary elevation view of the structure shown in FIG. 2.

The horizontal cross section of the crate chosen for illustrative purposes is substantially rectangular and, in the embodiment shown in FIGS. 1–3, each of the side panels have integrally formed along their upper edge a substantially L-shaped portion 9 including a substantially horizontally extending flange portion 10 and a vertically extending band portion 11, said flange and band portions cooperating to define a ledge 12 extending around the inner periphery of the crate 1 adjacent the top or rim portion thereof. A plurality of generally rectangular openings 13 extend horizontally through the band portion 11 at spaced intervals therealong, with at least one, and preferably two or more openings 13 being positioned intermediate the vertical side edges of each of the respective side panels.

An endless metal reinforcing rod member 15 is formed from a length of the steel rod shaped into a generally rectangular configuration by having its adjoining ends welded as at 16 to form a closed loop. The outer periphery of reinforcing member 15 is substantially equal to and is shaped to conform to the inner periphery of the band portion 11 when the lower edge surface 17 of the reinforcing member is disposed upon the ledge 12. The inner periphery of reinforcing rod 15 is shaped to form, in effect, a vertical continuation of the inner side surfaces of the respective side panels, as illustrated in FIG. 2 of the drawings. A plurality of tabs 18 are integrally formed on and project laterally from the outer peripheral surface of reinforcing rod member 15. Preferably tab members 18 are formed by coining a portion of the material from the outer edge of the steel rod. The tabs 18 have a generally rectangular cross section corresponding to the shape and size of the openings 13, with the tabs 18 being spaced to project one through each of the respective openings.

Reinforcing rod member 15 is dimensioned such that its upper edge surface 19 is substantially flush with the top edge surface of the band 11 so that the reinforcing rod member 15 forms a part of the top rim portion of the crate. In the event of impact loads applied to the top rim of the crate, as by dropping another crate thereon, or by striking the top edge of the crate against a hard surface while emptying or cleaning, the reinforcing rod member 15 will transmit the impact load over a substantial area of the ledge 12 thereby protecting the plastic sidewalls at the top rim against breaking or excessive damage.

The reinforcing rod member 15 is equally effective in reinforcing the crate for the usual purposes, i.e., providing the dimensional stability for the top of the crate and reinforcing the sidewalls of the crate against lateral loads, as in the prior art devices. Since the reinforcing rod is dimensioned to fit snugly on the ledge 12 within band 11, the outwardly extending horizontal tabs provide an effective interlock positively retaining the reinforcing rim on the crate. In this respect, it is pointed out that the maximum lateral load normally encountered, by such crates are impact loads from the outer surface rather than pressure loads from the inside; therefore, placing the reinforcing rod element on the inner periphery of the crate provides maximum reinforcing for the crate.

Figure 4:
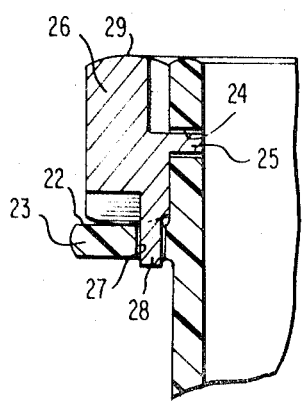
FIG. 4 is a view similar to FIG. 2 and illustrating an alternate embodiment of the invention.

Referring now to FIG. 4 of the drawings, an alternate embodiment of the invention is illustrated in which the inner peripheral surface of the sidewall are continuous, and the reinforcing rod retaining ledge 22 is formed by providing an outwardly projecting, substantially horizontal flange 23 extending around the outer periphery of the crate in vertically spaced relation to the top edge thereof. A plurality of generally rectangular openings 24 are formed in the sidewalls of the crate between flange 23 and the top peripheral edge thereof, in position to receive a plurality of inwardly extending tab members 25 on an endless reinforcing rod element 26. Tab members 25 are similar to tab members 18 on reinforcing rod member 15, but are formed on the inner rather than the outer periphery of the ring. In this embodiment it is necessary to provide means for preventing the sidewalls of the crate from being defected inwardly away from the reinforcing rod member 26. To this end, a plurality of vertically extending generally rectangular openings 27 are formed through the horizontally extending flange 23 in position to receive an equal number of vertically extending tab members 28 integrally formed on and projecting downwardly from the bottom edge of reinforcing rod member 26. Thus, tabs 28 disposed in openings 27, and tabs 25 disposed in opening 24 cooperate to retain reinforcing rod member 26 on the outer periphery of the crate and to prevent defection of the sidewalls of the crate under the influence of lateral loads. At the same time, the top edge 29 of reinforcing rod 26 protects the top rim of the crate against impact loads in the manner similar to that described above with regard to the embodiment illustrated in FIGS. 1–3. Thus, it is apparent that various modifications of the invention may be made while maintaining the concept of providing an exposed upper surface on the reinforcing rod member which forms a portion of the top rim surface of the crate.

Accordingly, while preferred embodiments of my invention have been disclosed and described, I wish it understood that I do not intend to be restricted solely thereto, but that I do intend to include all embodiments thereof which would be apparent to one skilled in the art and which come within the spirit and scope of my invention.

I claim:

1. In a material handling crate having integrally molded plastic sidewalls and reinforcing means on said sidewalls adjacent the open top of the crate, the improvement wherein said reinforcing means comprises an endless metal ring mounted on and extending around said crate adjacent the open top thereof and having an exposed upwardly directed surface defining at least a portion of the top rim surface of the crate, and retaining means supporting said reinforcing ring in position on said crate, said retaining means including an integrally molded substantially horizontal flange extending around said crate adjacent the open top thereof defining a substantially horizontal ledge positioned to engage and support a downwardly directed surface of said metal ring, said horizontal ledge being capable of transmitting vertical loads from said metal ring to said sidewalls, a band extending upwardly from said flange and cooperating therewith to define a shoulder, and means interlocking said retaining means and said metal ring including a plurality of openings extending through said band at spaced intervals around said crate and a plurality of integrally formed tab portions on said reinforcing ring extending through said openings and cooperating with said flange and said band to prevent substantial relative movement between said metal ring and said sidewalls of said crate.

2. In the material handling crate defined in claim 1, the further improvement wherein the top edge surface of said band and said exposed upwardly directed surface cooperate to define the top rim surface of said crate.

3. The material handling crate defined in claim 1, wherein said band extends upwardly from the outer peripheral edge of said flange to define said shoulder for supporting said reinforcing ring around the inner periphery at said crate at said open top.

4. The material handling crate defined in claim 3, wherein said openings extend horizontally through said band and said tabs project outwardly from the outer peripheral surface of said reinforcing ring in position to project one through each of said openings to prevent said reinforcing ring from being lifted vertically from said shoulder.

5. The material handling crate defined in claim 1, wherein said band extends upwardly from the inner peripheral edge of said flange to define said shoulder for supporting said reinforcing ring around the outer periphery of said crate at said open top, said band forming in effect a vertical continuation of said sidewalls above said flange.

6. The material handling crate defined in claim 5, wherein a portion of said openings are extended horizontally through said band and a portion extend vertically through said flange, said reinforcing ring having a portion of said tabs extending inward from the inner peripheral surface thereof to extend through said openings in said band to prevent vertical movement of said reinforcing ring and a portion of said tabs extending downward through said openings in said flange to prevent said sidewalls from being deflected inward relative to said reinforcing ring.

* * * * *